July 12, 1966

C. L. EDWARDS 3,260,314

PEANUT DIGGER, SHAKER, RESHAKER, AND INVERTER

Filed Feb. 11, 1964

INVENTOR.
Charles L. Edwards
BY
B. B. Olive
Attorney

July 12, 1966    C. L. EDWARDS    3,260,314
PEANUT DIGGER, SHAKER, RESHAKER, AND INVERTER
Filed Feb. 11, 1964    4 Sheets-Sheet 2

INVENTOR.
Charles L. Edwards
BY
B. B. Olive
Attorney

July 12, 1966  C. L. EDWARDS  3,260,314
PEANUT DIGGER, SHAKER, RESHAKER, AND INVERTER
Filed Feb. 11, 1964  4 Sheets-Sheet 3
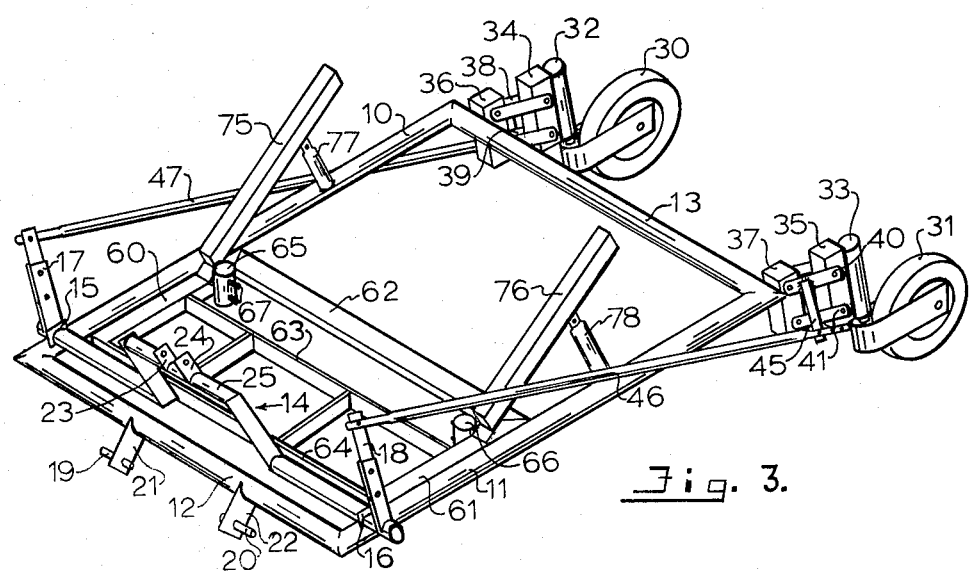
Fig. 3.
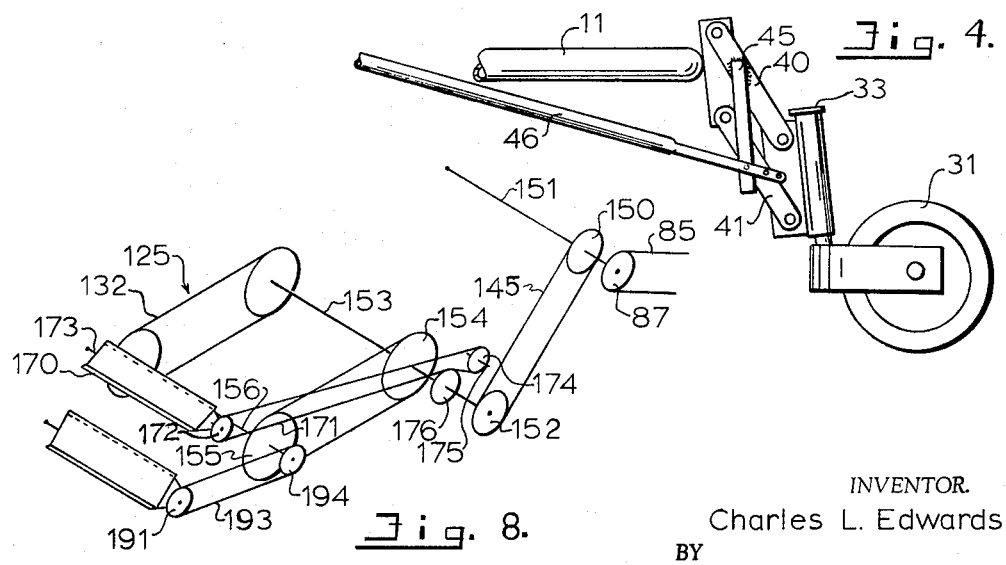
Fig. 4.
Fig. 8.
INVENTOR.
Charles L. Edwards
BY
R. B. Olive
Attorney July 12, 1966  C. L. EDWARDS  3,260,314
PEANUT DIGGER, SHAKER, RESHAKER, AND INVERTER
Filed Feb. 11, 1964  4 Sheets-Sheet 4
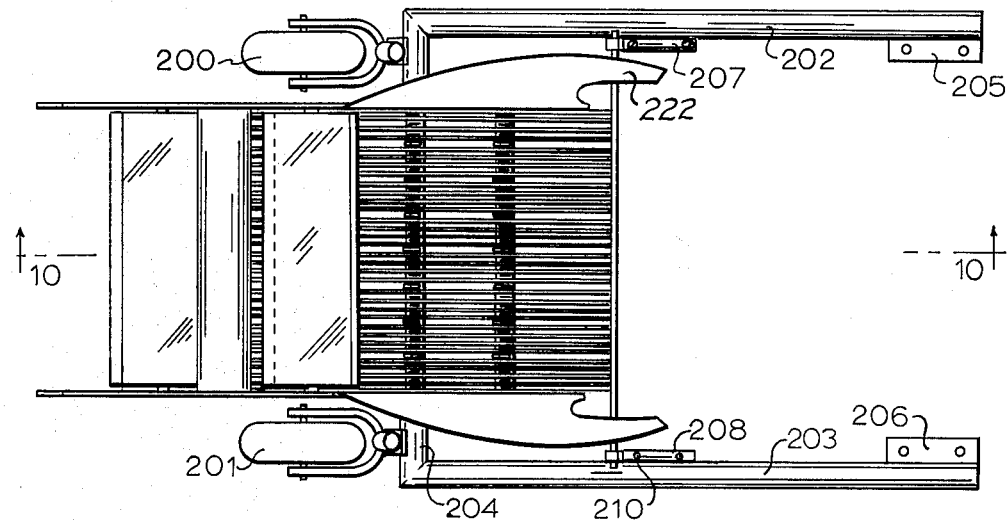
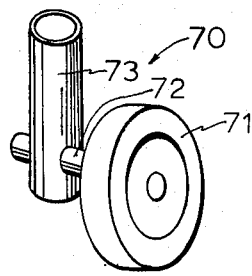
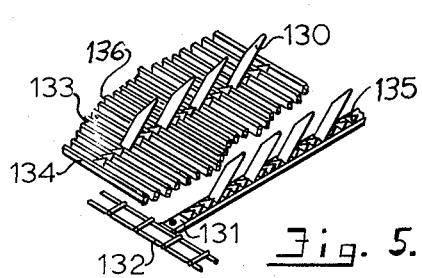
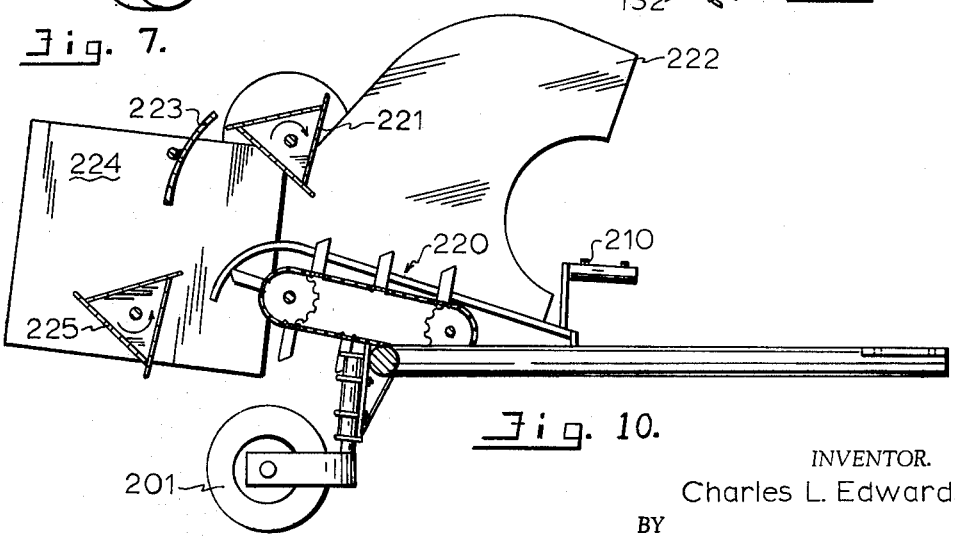
INVENTOR.
Charles L. Edwards
BY
R. B. Olive
Attorney

United States Patent Office 3,260,314
Patented July 12, 1966

3,260,314
PEANUT DIGGER, SHAKER, RESHAKER,
AND INVERTER
Charles L. Edwards, 306 E. Park Ave., Tarboro, N.C.
Filed Feb. 11, 1964, Ser. No. 344,058
6 Claims. (Cl. 171—101)

This invention relates to peanut harvesting equipment and particularly to an apparatus useful in digging the peanut vines containing the nuts from the earth, shaking the dug vines, reshaking the vines and depositing the dug vines in an inverted position such that the nuts are exposed for drying in the field.

In the harvesting of peanuts by machine it has been the practice to use a machine such as that represented by United States Patent 2,999,547 which severs the roots of the vines and unearths the vines with the nuts attached. As the machine moves along the row, the vines with nuts attached are directed to an upwardly inclined conveyor where they are subjected to a combination of shaking and beating for the purpose of removing any earth left attached to the vines or nuts. As the vines leave the conveyor they are deposited in a somewhat random array but primarily in such positions as to leave the nuts covered by the vines. The single pass through the machine leaves a susbtantial amount of earth on the vines and nuts which is undesirable and some of which is actually thrown on the vines and nuts as they are discharged. It is frequently the practice to run the machine back through the field and pass the previously unearthed vines and nuts back through the machine in order to accomplish a reshaking and further removal of earth from the vines and nuts. However, this still leaves the vines deposited so as to cover the nuts rather than leave them exposed for proper drying. A separate manual field operation is generally necessary to get the vines inverted and the nuts exposed for drying.

With the foregoing is mind, it is an object of this invention to provide an improved peanut harvesting apparatus.

Another object is to provide a peanut harvesting machine which accomplishes the shaking and reshaking operations in one pass of the vines and nuts through the machine.

Another object is to provide a peanut harvesting machine which after unearthing and shaking the vines deposits the vines back on the earth with the nuts turned up and exposed for purposes of drying.

Another object is to provide a peanut harvesting machine attachment for the conventional peanut harvesting machine which enables the vines and nuts prior to being deposited back on the earth to be subjected to a reshaking operation and when deposited back to be deposited with the nuts turned up and exposed for purposes of drying.

These and other objects of the invention will become apparent from the following description and the drawings, in which:

FIGURE 3 is a perspective view of the basic frame structure employed in the machine.

FIGURE 4 is a partial side elevation of a rear supporting wheel structure employed in the machine.

FIGURE 5 is a partial perspective illustrating a conveyor grate arrangement employed in the machine.

FIGURE 7 is a perspective of a front wheel assembly employed in the machine.

FIGURE 8 is a schematic representation of the conveyor belt and chain drive arrangement.

FIGURE 9 is a plan view of an alternative embodiment in the form a machine attachment.

FIGURE 10 is a sectional view taken on line 10—10 of FIGURE 9.

Figure 1:
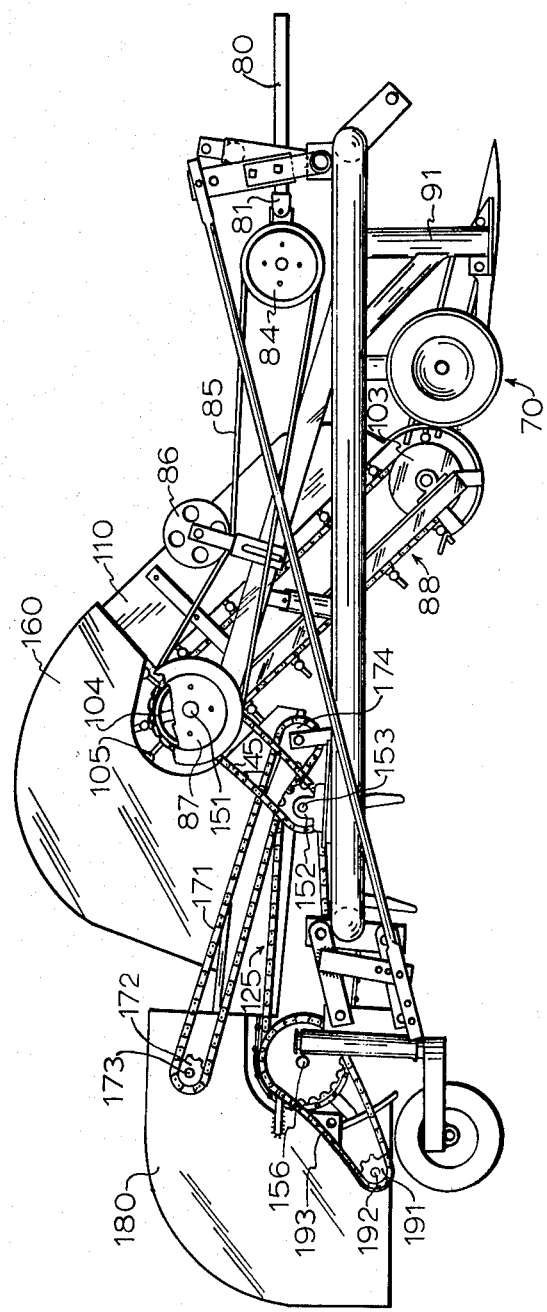
FIGURE 1 is an elevation view of a machine embodying the invention.

In general, the invention provides for the conventional digger and shaker an auxiliary conveyor onto which the lines and nuts drop from the end of the conventional first conveyor. The auxiliary conveyor subjects the vines and nuts to a reshaking and at the discharge end of the auxiliary conveyor the vines and nuts are deflected and passed over a beater in such a way that they are discharged in a substantially uniform array so that all of the nuts are left turned up and exposed for drying and substantially free of earth. The invention provides a unique frame arrangement for supporting the auxiliary conveyor, deflector and beater devices and which is adapted for a three point hitch in one embodiment and in another embodiment is adapted to be connected to the conventional digger and shaker so as to utilize the hitch of the conventional digger-shaker machine.

Referring to the drawings an explanation is first made of the invention embodied as a complete machine in which the basic frame is made of various welded and bolted tube and bar members including, as best seen in FIGURE 3, a pair of side tubes 10, 11 connected by transverse front and rear tubes 12, 13. Running parallel to tube 12 is a bent tube 14 mounted for rotation in appropriate bearing plates 15, 16 and having upright crank arms 17, 18 welded to the ends of tube 14. The conventional three point hitch for tractor connections includes for two points of connection a pair of pins 19, 20 respectively secured to a pair of plates 21, 22 welded to the front transverse tube 12. The third point of connection is made by means of the brackets 23, 24 which are welded to the cross member 25 which is part of the rotatable bent tube 14 previously referred to.

Still referring particularly to FIGURE 3, the rear of the frame is supported by a pair of wheels 31, 32 which are arranged to pivot freely on post members 32, 33. Posts 32, 33 are in turn integrally secured to further post members 34, 35. Post members 34, 35 are in turn secured to other post members 36, 37 through pivoted links 38, 39 and 40, 41. Posts 36, 37 are integrally secured to the rear transverse tube 13. Each of the upper links such as link 40 is rigidly secured to an arm member such as arm 45 and the respective arms such as arm 45 are pivotally connected to the respective tubes 46, 47 which make pivotal connections with the crank arms 17, 18. Thus by rotating the tube structure 14 with the tractor hitch point that connects to brackets 23, 24, the rear of the machine frame can be raised, as illustrated by FIGURE 4, or lowered so as to adjust the height of the rear of the machine with respect to the ground and by raising and lowering the transverse front tube 12 by means of the two tractor hitch points that connect to pins 19, 20, the height of the front of the machine with respect to the ground can be adjusted.

Considering the basic frame structure further and particularly FIGURE 3, the front of the frame includes two box frame members 60, 61 which are rigidly secured to the side members 10, 11 respectively, a transverse box frame member 62 which extends between members 60 and 61 and is rigidly secured thereto and two reinforcing transverse bar members 63, 64. Secured to the rear inside corners of members 60, 61, 62 are a pair of short tubular members 65, 66 having set screws such as at 67. As later seen in the description, members 60, 61, 62, 63 and 64 are primarily employed to strengthen the front of the frame and for the purpose of supporting the front conveyor and the drive mechanism which works off the tractor power take-off, not shown. Tubular members 65, 66 are employed for holding a pair of removable front wheel structures 70 (FIGURES 1 and 7) having wheels 71 mounted on axles 72 which are rigidly secured to tubular spindles 73. When mounted in the respective holders 65, 66 and secured by the appropriate set screws 67, the wheels 71 support the front of the frame which is desirable for mounting a uniform digger depth. When the machine is raised for turning around or for transport over land, the wheels 71 do not touch the ground, the front part of the machine being supported by the tractor. To complete the description of the basic frame structure of FIGURE 3, it will be noticed that two additional frame members 75, 76 are secured at one end to the respective members 60, 61 and are mounted at an angle with supporting members 77, 78 being rigidly secured thereto and maintaining the angled position. As seen later in the description, members 75, 76 are employed to support various pulleys and beater structures used in the first conveyor.

Figure 2:
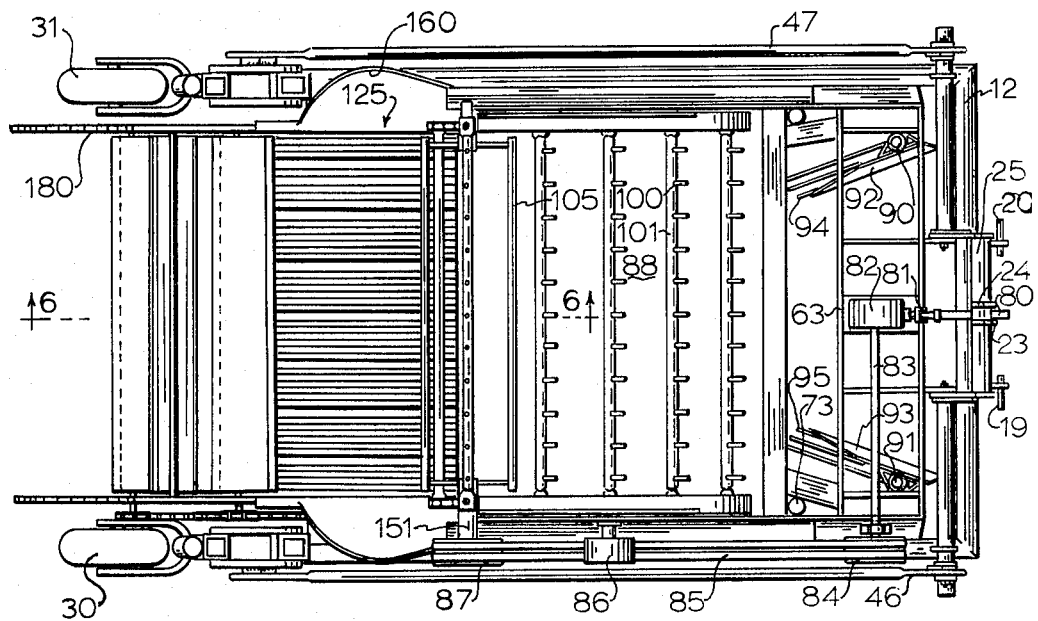
FIGURE 2 is a plan view of the machine.

The draw bar of the tractor, not shown, connects to the pins 19, 20 and the other tractor hitch connects by a bolt, not shown, to the connecting point provided by brackets 24, 25. The shaft 80 (FIGURES 1 and 2) connects to the tractor power take off and by means of a universal joint 81 to a gear box 82 which drives a shaft 83 on which is mounted a V-belt pulley 84 that drives a suitable multistrand V-belt 85. Belt 85 passes under an idle pulley 86 and is entrained to drive a pulley 87 which causes the first conveyor generally represented by 88 to be driven.

Beneath the front frame members there is mounted a pair of posts 90, 91 which are secured by suitable means to the frame and on the lower ends of which are attached conventional plow blades 92, 93 and the conventional guide arms 94, 95 which together unearth the vines and attached nuts and guide them into a narrow row preparatory to moving up the first conveyor 88. The vines are gathered up by the tines 100 mounted on the conveyor bars 101 which in turn are secured to the conveyor chain 102 that runs on suitable sprockets 103, 104. Since the first conveyor, per se, is conventional and may partake of the well known form described in more detail in United States Patent 2,999,547, it is not otherwise dealt with in detail. As further illustrated by Patent 2,999,547, the first conveyor may employ a beater such as beater 105 at the discharge end of the first conveyor to facilitate additional removal of earth in the first conveying operation. With respect to the first conveyor operation it is desirable to employ guide shields such as shield 110 (FIGURES 1 and 6) running parallel to the sides of the first conveyor 88.

Of particular interest to the present invention is the provision of the additional conveyor generally represented by 125 which is mounted at a slight incline immediately behind the first conveyor 88 such that conveyor 88 discharges the vines and nuts in a free fall onto conveyor 125 which carries them to the rear of the machine where they are discharged with the nuts turned up as previously discussed. Conveyor 125 is preferably of the grate type, a section being shown in FIGURE 5, and includes substantially long pointed, slightly forwardly sloped tines 130 mounted on supporting bars 131 which are suitably secured to a conveyor chain 132 such that when the chain 132 moves, the tines 130 pass through uninterrupted slots 133 of a grate 134 suitably fixed to the machine frame. Interspersed between tines 130 are additional relatively short pointed tines 135 which pass through and keep clear of loose earth other uninterrupted slots 136 located between slots 133. Thus when the vines and nuts represented at 140 in FIGURE 6 fall onto the grate 134, they are pulled along on the upper surface of the grate by tines 130 and the dirt remaining on the vines and nuts is given an additional shaking which causes such dirt to sift down through the various open slots in the grate.

Power is furnished to conveyor chain 132 by means of a chain 145 driven by a sprocket 150 mounted on the shaft 151 on which pulley 87 is mounted, FIGURE 8 being used to schematically illustrate the arrangement. Chain 145 in turn is entrained over a sprocket 152 (FIGURE 1) which is mounted on the shaft 153 (FIGURE 6) which mounts the conveyor 125 chain sprockets 154 at the receiving end of conveyor 125. At the discharge end of conveyor 125 similar chain sprockets 155 are mounted on a rotatable shaft 156.

As the nuts and vines leave the first conveyor, conveyor 88, they will be guided by the shields 160 in a free fall flight, illustrated in FIGURE 6, and it has been discovered that the vines and nuts will, if given room to turn about ninety degrees in free fall, deposit themselves on the second conveyor, conveyor 125, in such an array that they can be discharged from the second conveyor, when acted on by the supplementary beaters later described, in the desired position of having the nuts turned up in the field. The slope of conveyor 125 can vary however it is believed that for most field conditions an essentially flat or slight incline in conveyor 125 will give the best overall results. While not shown in detail the supporting means for conveyor 125 should preferably be adjustable. While enlarged for illustration in the drawing, conveyor 125 should preferably be two to four feet narrower than conveyor 88 and should preferably run at the same or about twenty-five percent higher speed and in the same direction as conveyor 88.

As the nuts and vines leave the discharge end of conveyor 125 they are preferably engaged by the edges of a beater 170 which is located transverse of the upper discharge end of the conveyor 125. Beater 170 is driven through a chain 171 which engages the sprocket 172 mounted on the rotatable shaft 173 on which beater 170 is mounted. Chain 171 further engages a sprocket 174 mounted on an idle shaft 175 and the lower run of chain 171 engages the driven sprocket 176, FIGURE 8, mounted on shaft 153, power being transmitted to chain 171 by sprocket 176. This particular drive arrangement is of course only one of many that might be employed. It has been found desirable however to rotate beater 170 so the beater edges move at the speed of conveyor 125, the vines and nuts being given both a flailing and a propelling action immediately before they leave conveyor 125.

Further guide shields 180 are provided at the very rear of the machine to insure deposit of the vines and nuts in a relatively uniform row and to also insure that all of the vines and nuts are subjected to essentially the same action during final discharge. The final action on the vines and nuts is performed by a beater 190 which is located essentially parallel to but rearwardly and downwardly from beater 170. Beater 190 is driven through a sprocket 191 which is mounted on the shaft 192 on which beater 190 is mounted. A chain 193 drives sprocket 191 and is in turn driven by a sprocket 194 (FIGURE 8) mounted on shaft 156. Beater 190 is preferably arranged to be driven so that the edges of beater 190 move at a speed about one-third faster than the speed of conveyor 125.

Figure 6:
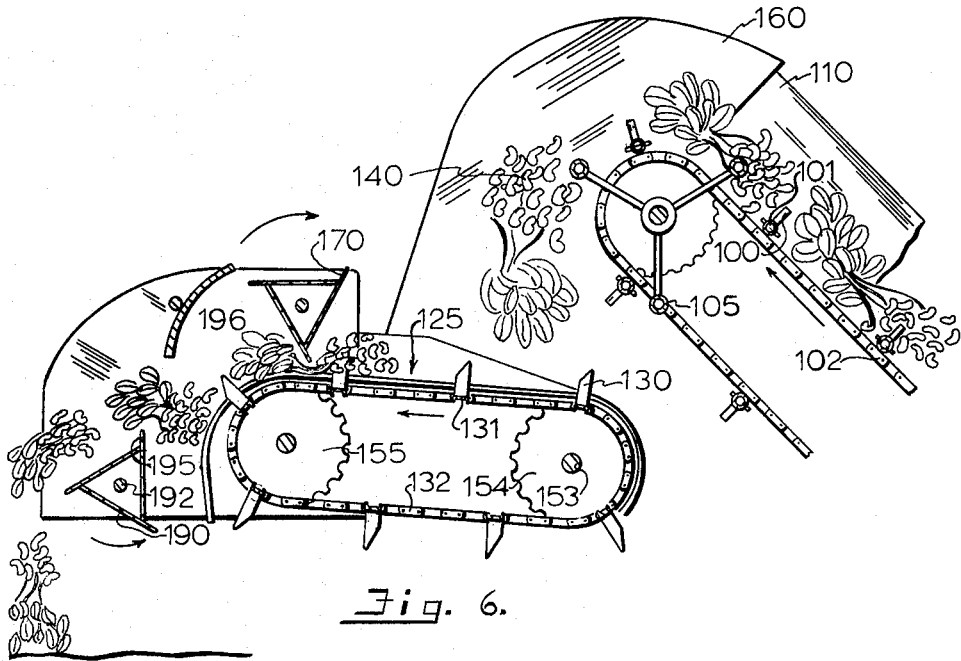
FIGURE 6 is an enlarged partial sectional elevation taken approximately along line 6—6 of FIGURE 2.

As indicated in FIGURE 6 beater 190 turns in a direction opposite to the direction in which beater 170 turns. As the vines and nuts are discharged they pass over the edges 195 of the beater 190 and below a fixedly mounted curved deflector shield 196 which insures that the vines and nuts will be subjected to the beating and propelling action inflicted by beater 190. While not detailed in the drawings shield 196 should preferably be adjustable in position to accommodate to different field conditions.

From the foregoing, it can be seen that as the tractor pulls the machine along, the vines with nuts attached will be unearthed and transported over the first conveyor, conveyor 88, where they will be subjected to an original shaking and beating. Following this, the nuts and vines will leave the first conveyor in a free fall and drop onto the receiving end of the second conveyor, conveyor 125, and in the process of dropping and being abruptly stopped will loose a portion of any additional earth remaining on the vines. The vines and nuts will next be dragged along the second conveyor and subjected to additional shaking during which additional earth will be lost through the grate slots of conveyor 125.

Just as the vines and nuts are about to be discharged from conveyor 125 they are engaged by the edges of beater 170 and given both a propelling and flailing action which results in additional loss of earth from the vines and nuts and results in the vines and nuts being carried below the deflector shield 196 and over the top of beater 190 where the vines and nuts receive a final flailing and propelling action. When finally ejected from the machine, the vines are so disposed as to leave the nuts on top of the vines and exposed and with substantially all of the earth removed from both vine and nuts.

The invention may be embodied in a complete machine as has just been described or it may be in the form of an auxiliary conveyor attachment for attachment to the conventional digger-shaker represented by Patent 2,999,547. The attachment form is illustrated by FIGURES 9 and 10. In this form, the supporting wheels 200, 201, comparable to wheels 30, 31 of the machine form, are mounted at the corner of a U-shaped frame which includes side members 202, 203 connected to a transverse end member 204. Side members 202, 203 are provided with integral brackets 205, 206 which are adapted to be secured to the side angle bars numbered 12 in Patent 2,999,547. A further means of attachment is provided by the tubular structures 207, 208 which are rigidly secured to the respective side members 202, 203 and which are adapted to engage the tubular protrusions of the guides numbered 72 in Patent 2,999,547 and be secured by the set screws 210 shown in FIGURES 9 and 10 of the present description. This alternate form of apparatus includes an auxiliary conveyor 220 comparable to conveyor 125, a beater 221 comparable to beater 170, a side shield 222 comparable to shield 160, a deflector shield 223 comparable to shield 196, a side shield 224 comparable to shield 180 and a beater 225 comparable to beater 190. While not shown it will of course be understood that suitable drive arrangements comparable to those previously explained would be provided for conveyor 220, beater 221 and beater 225. Once rigidly attached to the conventional digger-shaker by means of the brackets 205, 206 and tubular structures 207, 208 it will also be understood that the auxiliary conveyor frame of FIGURES 9 and 10 can be controlled as to position above the earth when in operation by whatever means control the position of the conventional digger-shaker to which it, the auxiliary apparatus of the invention, would be attached. Furthermore, once so attached and with suitable conveyor and beater drive arrangements, the attachment apparatus of FIGURES 9 and 10 will perform in the field in the manner previously explained. The primary advantage of embodying the invention in the form of an attachment is of course that the farmer owning conventional digger-shaker equipment can utilize his conventional equipment and at the same time enjoy the benefits of the invention.

Having described the invention, what is claimed is:

1. In a combined tractor pulled and driven peanut digger and shaker of the type having plow means for severing and unearthing peanut vines and guiding the unearthed vines into a row, a first endless open bar belt type conveyor means for picking up the vines with the peanuts attached and moving them up a substantially steep incline to be discharged rearwardly therefrom; a reshaker and vine inverter comprising a second endless open bar belt type conveyor means longitudinally aligned with said first conveyor means for receiving the vines discharged therefrom and moving them up a substantially shallow incline to be discharged at a point rearwardly therefrom, the receiving end of said second conveyor means together with the axis supporting such end being located a substantial distance and directly below the discharge end of said first conveyor means, said distance enabling said vines to be turned approximately ninety degrees while in free fall and subjecting them to being abruptly stopped from said free fall and to being positioned on said second conveyor means in an array adapted to being finally discharged with the peanuts turned up; rotatable beater bar means disposed across the width of said second conveyor means, rearwardly and below the discharge end thereof, and coordinated to the movement of the second conveyor means to strike said vines and nuts from beneath while in free fall after they are discharged from said second conveyor means; means for driving said second conveyor means and beater bar means from said tractor; deflecting means disposed across the width of said second conveyor means adjacent the discharge end thereof and being effective to direct said vines downwardly towards said beater bar means after leaving said second conveyor means, said vines thereby being discharged substantially vertically and deposited in windrow fashion with substantially all of the uprooted peanuts left uppermost.

2. The structure of claim 1 and a second rotatable beater bar means positioned across and above the discharge end of said second conveyor means and adapted to strike and shake said vines while leaving the discharge end of said second conveyor means and means to drive said second beater bar means.

3. The structure of claim 1 in which said beater bar means has a peripheral speed substantially higher than the speed of said second conveyor means.

4. In a tractor pulled and driven combined peanut digger and shaker of the type having plow means for severing and unearthing peanut vines and guiding the unearthed vines into a row; a first endless conveyor means for picking up the vines with the peanuts attached and moving them up a first incline to be discharged rearwardly therefrom, and a first rotatable beater bar means disposed across the width of the first conveyor means and coordinated to the movement of the first conveyor means to strike and give the vines a first shaking effect as they pass over the first conveyor means; a reshaker and vine inverter comprising a second endless conveyor means longitudinally aligned with said first conveyor means for receiving the vines discharged therefrom and moving them up a substantially less incline and discharging the same to the ground in a windrow, said second conveyor means having a grate with slots permitting passage of earth therethrough and side chains mounting transverse bars having substantially widely and regularly spaced tines extending through said slots and adapted to convey the vines over said grate, the receiving end of said second conveyor means being located a substantial distance and directly below the discharge end of said first conveyor means thereby enabling said vines to be turned while in free fall and subjecting them to being abruptly stopped from said free fall and to being positioned on said second conveyor means in an array adapted to being finally discharged with the peanuts turned up; second rotatable beater bar means disposed across the width of and above the discharge end of said second conveyor means and coordinated to the movement of the second conveyor means to strike and give said vines a second shaking effect as they pass over the discharge end of said second conveyor means; deflecting means disposed across the width of said second conveyor means adjacent the discharge end thereof and being effective to direct said vines downwardly after leaving said second conveyor means; and a third rotatable beater bar means across the width of said second conveyor means and being mounted below and rearwardly of the discharge end of said second conveyor means and adapted to strike and shake said vines from beneath while in free fall; and means to drive said second conveyor and second and third beater bar means, said vines thereby being discharged substantially vertically and deposited in windrow fashion with substantially all of the uprooted peanuts left uppermost.

5. In a combined peanut digger and shaker of the type having plow means for severing and unearthing peanut vines and guiding the unearthed vines into a row, a first endless conveyor means for picking up the vines with the peanuts attached and moving them up an incline to be discharged rearwardly therefrom and means adapted to connect to a tractor power take-off and three point hitch for pulling and driving said digger and shaker; a reshaker and vine inverter comprising a second endless conveyor means longitudinally aligned with said first conveyor means for receiving the vines discharged therefrom and moving them to be discharged at a point rearwardly therefrom, said second conveyor means being arranged with respect to said first conveyor means such that said nuts and vines experience a free fall and land positioned on said second conveyor means in an array adapted to being finally discharged with the peanuts turned up, a frame mounting said first and second conveyor means, means connecting the front of said frame to two points of said hitch, thereby enabling the front of said frame to be regulated in height above earth, a pair of wheel structures pivotally mounted at the respective rear corners of said frame and lever means connected between said wheel structures and the third point of said hitch enabling the said structure to be pivotally positioned by movement of said third point thereby enabling the rear of said frame to be regulated in height above earth.

6. The structure of claim 4 including means detachably connecting said reshaker and vine inverter to said first conveyor means and said means to drive said second conveyor and second and third beater bar means comprises means driven from said first conveyor means.

References Cited by the Examiner

UNITED STATES PATENTS

| | | | |
|---|---|---|---|
| 643,249 | 2/1900 | Kretzer | 171—117 |
| 669,908 | 3/1901 | Williams | 171—127 |
| 1,802,211 | 4/1931 | Lively | 171—116 |
| 2,999,547 | 9/1961 | Long | 171—101 |

ANTONIO F. GUIDA, *Acting Primary Examiner.*